(12) United States Patent
Kim et al.

(10) Patent No.: US 9,086,100 B2
(45) Date of Patent: Jul. 21, 2015

(54) CONSTANT VELOCITY JOINT (71) Applicants: Hyundai Motor Company, Seoul (KR); Kia Motors Corporation, Seoul (KR)

(72) Inventors: Hyo Seok Kim, Gwangmyeong-si (KR); Min Kyu Kim, Hwaseong-si (KR)

(73) Assignees: HYUNDAI MOTOR COMPANY, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 14/058,110

(22) Filed: Oct. 18, 2013

(65) Prior Publication Data
US 2014/0135133 A1    May 15, 2014

(30) Foreign Application Priority Data

Nov. 15, 2012  (KR) .......................... 10-2012-0129746

(51) Int. Cl.
*F16D 3/205* (2006.01)
*F16D 3/202* (2006.01)

(52) U.S. Cl.
CPC ........ *F16D 3/205* (2013.01); *F16D 2003/2026* (2013.01)

(58) Field of Classification Search
USPC .................. 464/11, 111, 123, 124, 132, 905; 384/567, 569
See application file for complete search history.

(56) References Cited

U.S. PATENT DOCUMENTS

| 828,387 | A | * | 8/1906 | Crane | ........................ 384/567 |
| 4,002,380 | A | * | 1/1977 | Bowen | ........................ 384/567 |
| 4,433,627 | A | * | 2/1984 | Forshee | .................... 384/569 X |
| 4,484,900 | A | * | 11/1984 | Orain | ............................ 464/111 |
| 5,306,090 | A | * | 4/1994 | Niwa et al. | ................ 384/569 X |

FOREIGN PATENT DOCUMENTS

| JP | 09-317782 | | 12/1997 | | |
| JP | 2008-164128 | A | 7/2008 | | |
| JP | 2009-197920 | A | 9/2009 | | |
| KR | 10-2011-0121820 | A | 11/2011 | | |
| SU | 1663260 | A | * 7/1991 | ................... | 464/132 |
| SU | 1663260 | A1 | * 7/1991 | ................... | 464/132 |

OTHER PUBLICATIONS

Universal Joint and Driveshaft Design Manual, AE-7, Society of Automotive Engineers, Inc., Warrendale, PA, pp. 131-140, TJ1079. S62 1979.*

* cited by examiner

*Primary Examiner* — Gregory Binda
(74) *Attorney, Agent, or Firm* — McDermott Will & Emery LLP (57) ABSTRACT A constant velocity joint includes a constant velocity joint housing with guide grooves on the inner side of the housing, a spider disposed in the constant velocity joint housing, combined with a shaft, and having a spider journal, and spherical rollers disposed in the guide grooves of the constant velocity joint housing. Needle bearings are disposed between the spherical rollers and the spider journals, in which a plurality of needle bearing insert holes is formed in the spherical rollers, and disposed in the needle bearing insert holes.

6 Claims, 7 Drawing Sheets

CONSTANT VELOCITY JOINT

CROSS-REFERENCE TO RELATED APPLICATION

This application claims the benefit of priority to Korean Patent Application No. 10-2012-0129746 filed in the Korean Intellectual Property Office on Nov. 15, 2012, the entire contents of which are incorporated herein by reference.

TECHNICAL FIELD

The present disclosure relates to a constant velocity joint, more particularly, to a constant velocity joint reducing number of needle bearings and simplifying the manufacturing process.

BACKGROUND

In general, a Constant Velocity Joint (CVJ) is a device that enables a drive shaft to transmit power at constant velocity and at various angles. The constant velocity joint is generally used for front wheel drive cars or all-wheel drive cars.

Figure 1:
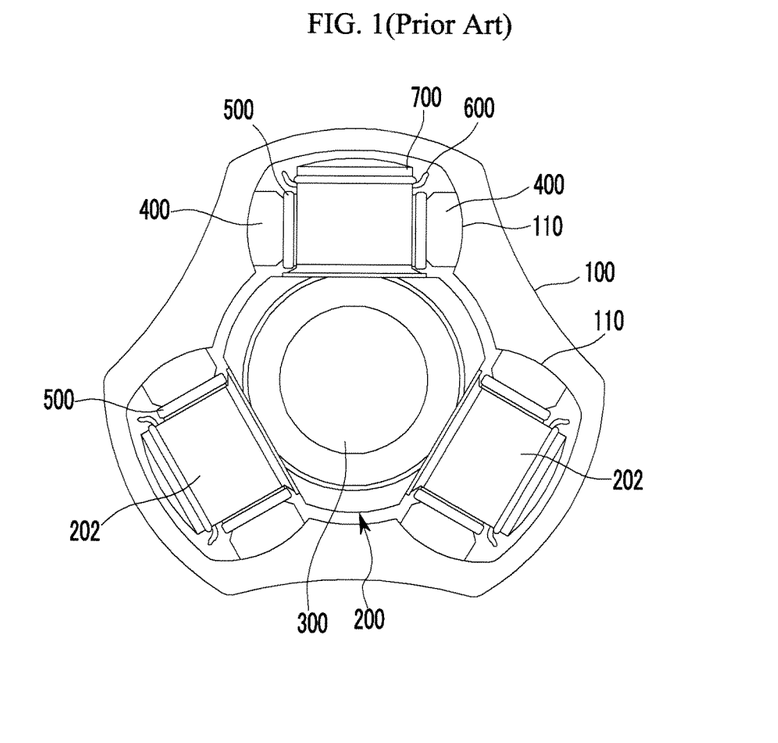
FIG. 1 is a view showing a common constant velocity joint.

FIG. 1 is a view showing a common constant velocity joint. Referring to FIG. 1, a common constant velocity joint includes a constant velocity joint housing 100 having guide grooves 110 on the inner side, a spider 200 disposed in the constant velocity joint housing 100, combined with a shaft 300, and having a spider journal 202, spherical rollers 400 disposed in the guide grooves 110 of the constant velocity joint housing 100, and needle bearings 500 disposed between the spherical rollers 400 and the spider journals 202.

Further, a striker 600 and a circlip 700 are disposed on the spider journal 202 to prevent separation of the needle bearings 500.

Power outputted from an engine (not shown) is transmitted to the housing 100 and then transmitted to a wheel (not shown) through the spherical rollers 400, the spider 200, and the shaft 300.

Even if the phase of the wheel changes, depending on the traveling conditions of a vehicle, the spherical rollers 400 move along the guide grooves 110, such that the connection angle between the shaft 300 and the housing 100 changes and the power from the engine is smoothly transmitted to the wheel.

However, there are about thirty needle bearings needed for one set of rollers, each constant velocity joint needing three sets of rollers, and two constant velocity joints are usually needed for a front wheel drive car, such that about one hundred eighty needle bearings are needed.

Further, burden on cost is high, because many parts require grinding. Grinding is added after turning to reduce friction force on the contact surfaces of the parts, and precise grinding is required for the inner side of the spherical rollers 400 and the outer side of the spider journals 202 which are in contact with the needle bearings 500. Noise, vibration, and harshness (NVH) characteristic is poor due to many friction surfaces, where friction is generated on the surfaces between the needle bearings 500, the spherical rollers 400, and the spider journals 202, and between the needle bearings 500.

The above information disclosed in this Background section is only for enhancement of understanding of the background of the present disclosure and therefore it may contain information that does not form the prior art that is already known in this country to a person of ordinary skill in the art.

SUMMARY

The present disclosure has been made in an effort to provide a constant velocity joint having advantages of reducing the number of parts, the process of grinding, and friction surfaces.

A constant velocity joint includes a constant velocity joint housing having guide grooves on the inner side thereof, and a spider disposed in the constant velocity joint housing combined with a shaft and having a spider journal. Spherical rollers are disposed in the guide grooves of the constant velocity joint housing, and needle bearings are disposed between the spherical rollers and the spider journals, in which a plurality of needle bearing insert holes are formed in the spherical rollers and the needle bearings are disposed in the needle bearing insert holes, respectively.

In one or a plurality of exemplary embodiments of the present disclosure, the constant velocity joint may further include strikers and circlips disposed on the spider journal to prevent the needle bearing from being separated.

In exemplary embodiments of the present disclosure, a stepped portion, preventing the needle bearings being separated, is formed on the spider.

In exemplary embodiments of the present disclosure, the inner diameter of the spherical roller is larger than the radius of revolution of the needle bearing center around the spider journal.

In exemplary embodiments of the present disclosure, the needle bearing insert hole is formed in a curved surface on the inner side of the spherical roller such that the contact point with the needle bearing goes away from the center of the spider journal.

In exemplary embodiments of the present disclosure, the needle bearing is formed in the shape of a hollow pipe.

In exemplary embodiments of the present disclosure, one or more through-holes are formed through the inner and outer sides of the needle bearing.

In another exemplary embodiment of the present disclosure, a constant velocity joint includes a constant velocity joint housing having guide grooves on the inner side thereof. A spider is disposed in the constant velocity joint housing, combined with a shaft, and has a spider journal. Spherical rollers are disposed in the guide grooves of the constant velocity joint housing, and needle bearings are disposed between the spherical rollers and the spider journals, in which a plurality of needle bearing insert holes is formed in the spider rollers and the needle bearings are disposed in the needle bearing insert holes, respectively.

In exemplary embodiments of the present disclosure, the constant velocity joint further includes strikers and circlips disposed on the spider journal to prevent the needle bearing being separated.

In exemplary embodiments of the present disclosure, a stepped portion preventing the needle bearings from separating is formed on the spider.

The radius of revolution of the needle bearing center around the spider journal may be larger than the outer radius of the spider journal.

The needle bearing insert hole may be formed in a curved surface on the outer side of the spider journal such that the contact point with the needle bearing goes away from the center of the spider journal.

In exemplary embodiments of the present disclosure, the needle bearing is formed in the shape of a hollow pipe.

In exemplary embodiments of the present disclosure, one or more through-holes are formed through the inner and outer sides of the needle bearing.

According to a constant velocity joint of an exemplary embodiment of the present disclosure, it is possible to reduce the number of parts and the process of grinding, such that it is possible to decrease the manufacturing cost.

Further, according to a constant velocity joint of an exemplary embodiment of the present disclosure, friction surfaces can be reduced, such that the NVH characteristic can be improved.

DETAILED DESCRIPTION OF THE EMBODIMENTS

In the following detailed description, only certain exemplary embodiments of the present disclosure have been shown and described, simply by way of illustration.

As those skilled in the art would realize, the described embodiments may be modified in various different ways, all without departing from the spirit or scope of the present disclosure.

Like reference numerals are given to like components throughout the specification. In the drawings, the thickness of layers, films, panels, regions, etc., are exaggerated for clarity.

The case in which it is represented that each part such as a layer, a film, an area, a plate, or the like, is "on" another part is intended to include not only the case in which each part is "directly on", but also the case in which the other part is between each part and another part.

In contrast, when an element is referred to as being "directly on" another element, there are no intervening elements present.

Throughout the specification, unless explicitly described to the contrary, the word "comprise" and variations such as "comprises" or "comprising," will be understood to imply the inclusion of stated elements but not the exclusion of any other elements.

An exemplary embodiment of the present disclosure will hereinafter be described in detail with reference to the accompanying drawings.

Figure 2:
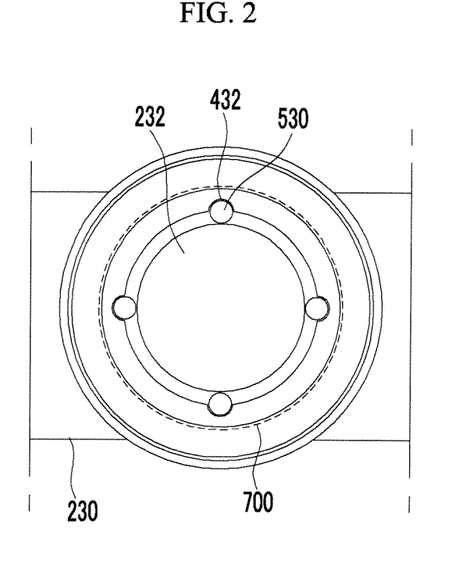
FIG. 2 is a view showing a portion of the configuration of a constant velocity joint according to exemplary embodiments of the present disclosure.

FIG. 1 is a view showing a common constant velocity joint and FIG. 2 is a view showing a portion of the configuration of a constant velocity joint according to exemplary embodiments of the present disclosure.

A configuration similar to or the same as a constant velocity joint according to exemplary embodiments is described first with reference to the configuration of a common constant velocity joint.

In describing a constant velocity joint according to exemplary embodiments of the present disclosure, the same components as those of the common constant velocity joint are given the same reference numerals for better comprehension and ease of description.

A constant velocity joint according to exemplary embodiments of the present disclosure includes a constant velocity joint housing 100 having guide grooves 110 on the inner side, a spider 230 disposed in the constant velocity joint housing 100, combined with a shaft 300, and having a spider journal 232, spherical rollers 430 disposed in the guide grooves 110 of the constant velocity joint housing 100, and needle bearings 530 disposed between the spherical rollers 430 and the spider journal 232.

A plurality of needle bearing insert holes 432 are formed in the spherical roller 430 and the needle bearing 530 is disposed in the needle bearing insert holes 432.

The constant velocity joint further includes strikers 600 and circlips 700 in the spider journal 232 to prevent the needle bearings being separated.

Figure 3:
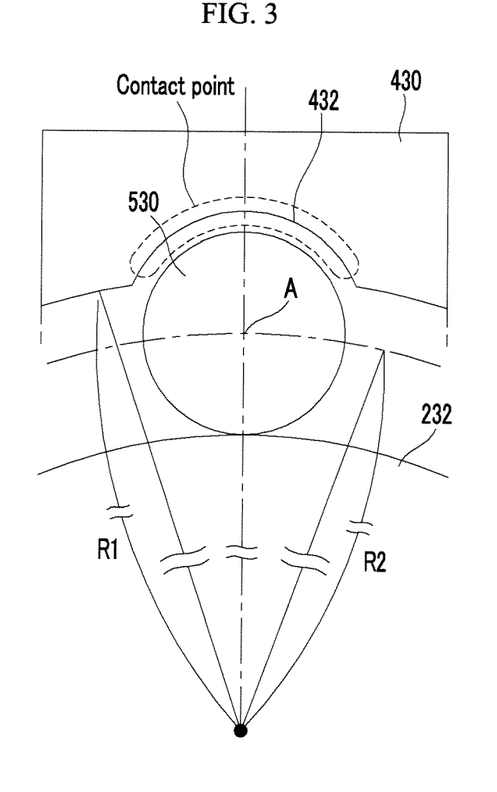
FIGS. 3 and 4 are views showing a needle bearing and a needle bearing insert hole of a constant velocity joint according to exemplary embodiments of the present disclosure.
Figure 4:
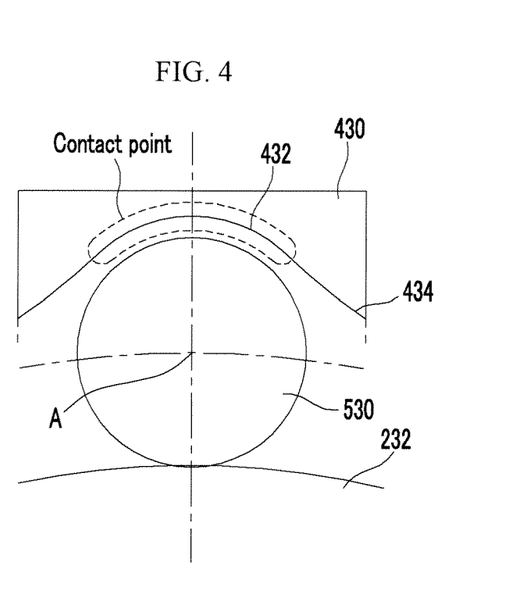

FIGS. 3 and 4 are views showing a needle bearing and a needle bearing insert hole of a constant velocity joint. Referring to FIG. 3, in exemplary embodiments of the present disclosure, the inner diameter R1 of the spherical roller 430 is larger than the radius of revolution R2 of the needle bearing center A around the spider journal 232.

The relative contact point is supposed to be out of the needle bearing center A in rotation of the needle bearing 530 to induce rolling contact of the needle bearing 530. Therefore, the inner radius R1 of the spherical roller 430 is set to be larger than the radius of revolution R2 of the needle bearing center A around the spider journal 232.

Referring to FIG. 4, in one or a plurality of exemplary embodiments of the present invention, the needle bearing insert hole 432 may be formed in a curved surface 434 on the inner side of the spherical roller such that the contact point with the needle bearing goes away from the center of the spider journal.

Figure 5:
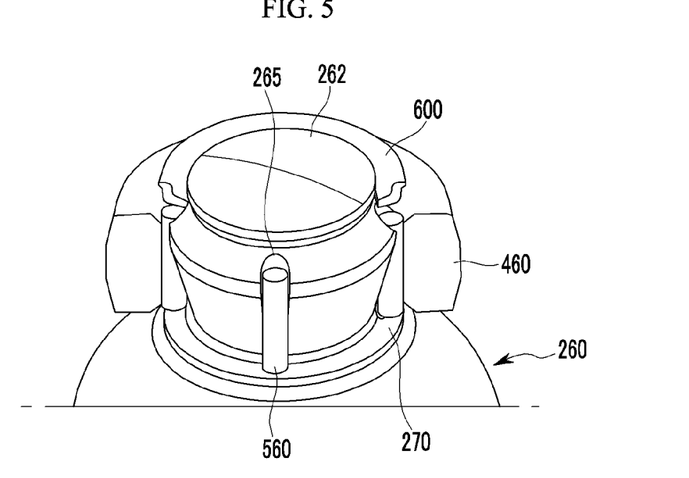
FIG. 5 is a partial cut view showing a portion of the configuration of a constant velocity joint according to exemplary embodiments of the present disclosure.

FIG. 5 is a partial cut view showing a portion of the configuration of a constant velocity joint. Referring to FIG. 5, in a constant velocity joint, a plurality of needle bearing holes 265 are formed in a spider journal 262 of a spider 260, and a needle bearing 560 is disposed in the needle bearing insert holes 265, such that friction with a spherical roller 460 can be reduced.

That is, the needle bearing insert holes 265 may be formed in the spider journal 262.

Referring to FIG. 5, the constant velocity joint may also have a configuration for inducing rolling contact, similar to the configuration shown in FIGS. 3 and 4.

In the constant velocity joint, the radius of revolution of the needle bearings 560 is set to be larger than the outer radius of the spider journal 262.

Further, similar to that shown in FIG. 4, the needle bearing insert hole 265 may be formed in a curved surface on the outer side of the spider journal 262 such that the contact point with the needle bearing 560 is spaced apart from the spider journal 262.

The radius of revolution of the needle bearings 560, the action of the outer side of the spider journal 262, and forming of the curved surface in the constant velocity joint shown in FIG. 5 are similar to/the same as those shown in FIGS. 3 and 4 and repetitive description is not provided. A stepped portion 270 preventing the needle bearings 560 from being separated may be formed on the spider 260.

Figure 6:
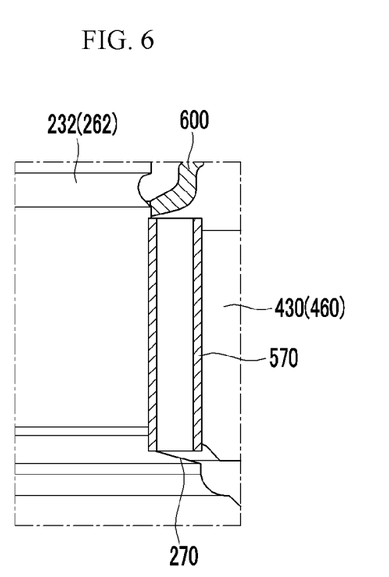
FIG. 6 is a partial cross-sectional view showing a portion of the configuration of a constant velocity joint according to exemplary embodiments of the present disclosure.

FIG. 6 is a partial cross-sectional view showing a portion of the configuration of a constant velocity joint. Referring to FIG. 6, a needle bearing 570 may be formed in the shape of a hollow pipe.

When the needle bearing is formed in the shape of a hollow pipe, friction may be reduced between parts by injecting a lubricant (grease) into the needle bearing and easily dissipate friction heat of the needle bearing 570.

Figure 7:
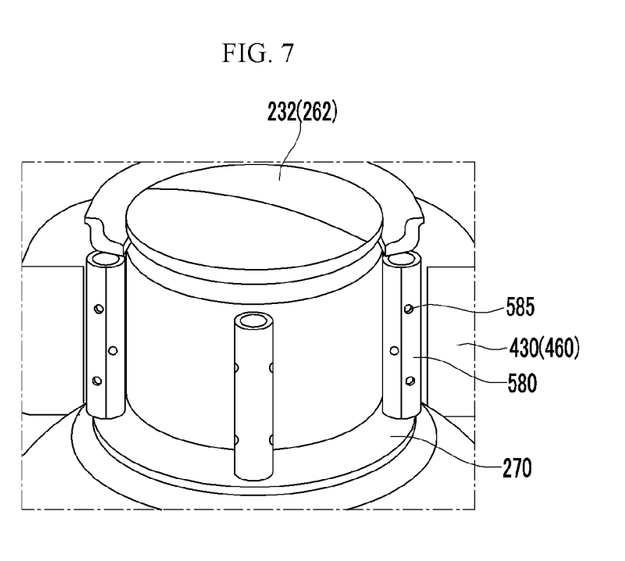
FIG. 7 is a partial cut view showing a portion of the configuration of a constant velocity joint according to exemplary embodiments of the present disclosure.

FIG. 7 is a partial cut view showing a portion of the configuration of a constant velocity joint. Referring to FIG. 7, a needle bearing 580 is a hollow pipe and one or more through-holes 585 may be formed through the inner and outer sides of the needle bearing 580.

When the needle bearing 580 is formed in the shape of a hollow pipe and the through-holes 585 are formed, friction may be reduced between members by injecting a lubricant (grease) into the needle bearing due to an increase in contact area with the lubricant through the through-holes 585 and friction heat dissipation.

As the needle bearing insert holes 265 and 432 are formed and the needle bearings 530, 560, 570, and 580 are inserted in the needle bearing insert holes 265 and 432, at least any one of the processes of grinding the spider journals 232 and 262 and the spherical rollers 430 and 460 can be removed, thus simplifying the entire process.

The number of needle bearings 530, 560, 570, and 580 that are used can be reduced to be smaller than the number of needle bearings used in a common constant velocity joint, such that the number of parts can be reduced, and the process can be more simplified. Further, using the hollow needle bearings 570 and 580 allows a decrease in friction between members and easy dissipation of friction heat of the needle bearings 570 and 580.

While this embodiment has been described in connection with what is presently considered to be practical exemplary embodiments, it is to be understood that the inventive concept is not limited to the disclosed embodiments. On the contrary, it is intended to cover various modifications and equivalent arrangements included within the spirit and scope of the appended claims.

What is claimed is:

1. A constant velocity joint comprising:
   a constant velocity joint housing having guide grooves on an inner side thereof;
   a spider disposed in the constant velocity joint housing, combined with a shaft, and having a spider journal;
   spherical rollers disposed in the guide grooves of the constant velocity joint housing; and
   needle bearings disposed between the spherical rollers and the spider journal,
   wherein a plurality of needle bearing insert holes are formed in the spherical rollers and the needle bearings are disposed in the needle bearing insert holes, and
   the needle bearing insert holes are formed in a curved surface on an inner side of the spherical rollers such that a contact point of the needle bearing insert holes and the needle bearings is farther away from the center of the spider journal than a contact point of the spider journal and the needle bearings.

2. The constant velocity joint of claim 1, further comprising strikers and circlips disposed on the spider journal to prevent the needle bearings from being separated.

3. The constant velocity joint of claim 1, wherein a stepped portion preventing the needle bearings from being separated is formed on the spider.

4. The constant velocity joint of claim 1, wherein an inner radius of the spherical rollers is larger than a radius of revolution of the center of needle bearings around the spider journal.

5. The constant velocity joint of claim 1, wherein the needle bearings have a hollow pipe shape.

6. The constant velocity joint of claim 5, wherein one or more through-holes are formed through inner and outer sides of the needle bearings.

* * * * *